March 26, 1940.   T. ABRAMS   2,194,682
CONTOUR FINDER
Filed June 30, 1938   2 Sheets-Sheet 1
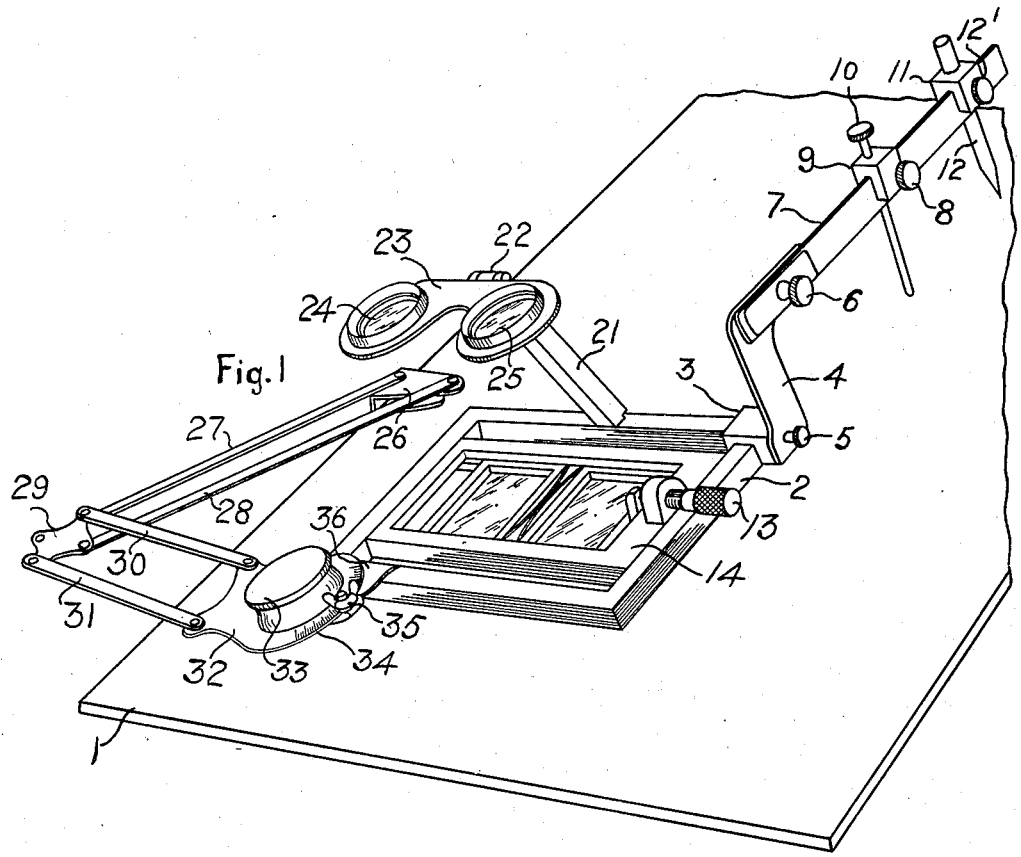
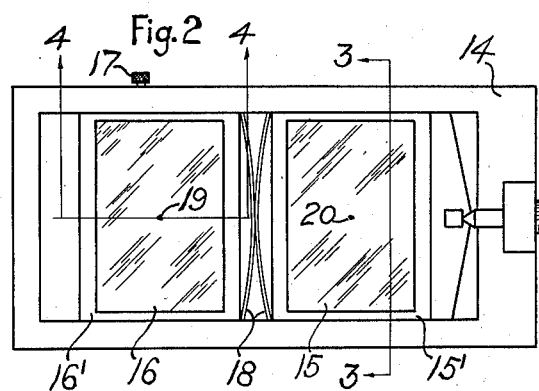
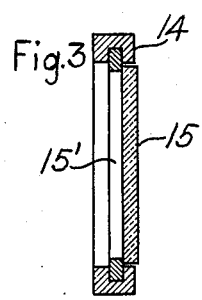
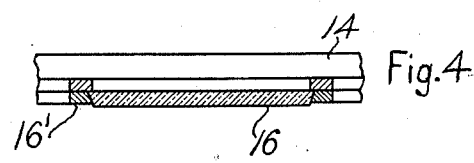
Talbert Abrams   Inventor
By Samuel H. Davis   Attorney March 26, 1940. T. ABRAMS 2,194,682
CONTOUR FINDER
Filed June 30, 1938 2 Sheets-Sheet 2

Talbert Abrams  Inventor

By

Samuel H. Davis
Attorney

Patented Mar. 26, 1940

2,194,682

UNITED STATES PATENT OFFICE 2,194,682

CONTOUR FINDER

Talbert Abrams, Lansing, Mich.

Application June 20, 1938, Serial No. 216,813

2 Claims. (Cl. 33—20)

This invention relates to apparatus termed contour finders and it is designed to make available for office and field purposes a parallax measuring construction to be employed in connection with aerial photographs.

It is an object of this invention to provide an instrument of the nature stated, comprising as ordinarily made, four co-acting portions, a folding magnifying lens stereoscope, a micrometer adjustment for measuring parallax, a drafting arm carrying scribing devices, and a drafting board with swinging arm adjustment to hold the contour finder in alignment. It is a further object of this invention to fashion the various contrivances constituting those instrumental portions in a special manner structurally whereby it is believed the convenience, accuracy and adaptability of the whole is materially and advantageously augmented.

By means of the accompanying drawings forming a part of this application the construction and arrangement of the operating members are illustrated. Of the drawings Fig. 1 represents a perspective view showing all parts assembled.

Fig. 2 is a top plan view of the movable glass frame, showing the glass plates with the indicator dots and the micrometer screw for adjusting the plates.

Fig. 3 is a sectional view of the parts set out in Fig. 2 taken along the line 3—3 of Fig. 2.

Fig. 4 is a sectional view taken along the indirect line 4—4 of Fig. 2.

Throughout the drawings and description the same number is used to refer to the same part.

Figure 5:
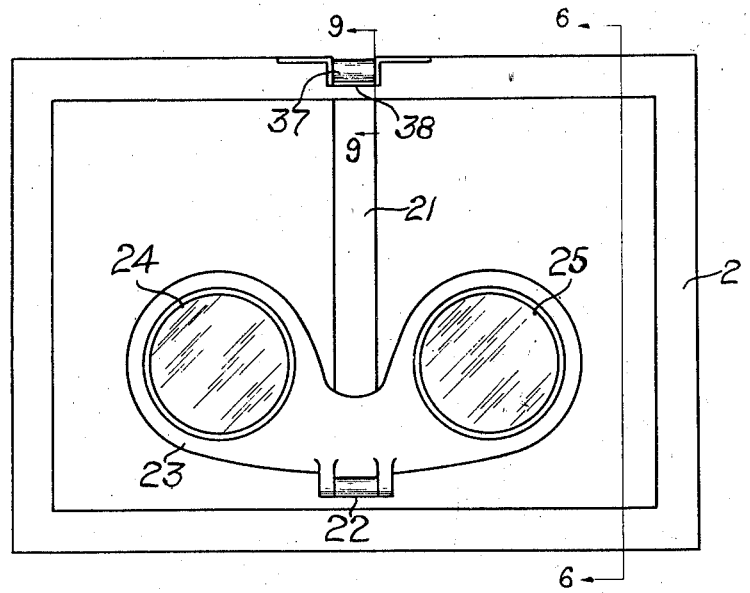
Fig. 5 is a plan view of the movable frame, showing the pivoted arm carrying the lens frame and lenses in the inverted positions and illustrating the limit of the movement of the arm.
Figure 6:
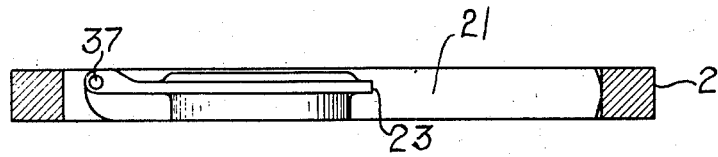
Fig. 6 is a sectional view taken along the line 6—6 of Fig. 5.
Figure 7:
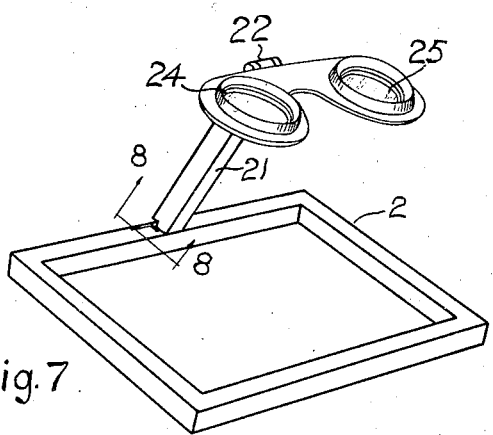
Fig. 7 is a detached view of the movable frame showing the position of the pivoted arm when inclined, and the lens frame and lenses supported by the arm.
Figure 8:
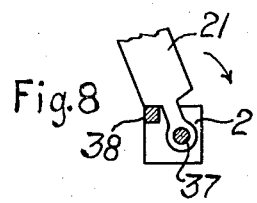
Fig. 8 is a fragmentary view of the pivoted end of the arm in its inclined position.

In Fig. 1, a drawing board 1 supports the rectangular movable frame 2, which is usually provided with a corner block 3 by which it may be connected with the angle piece 4 by the thumbscrew 5. Frame 2 may be bodily moved or turned on the board in any direction, by hand or by the connections as shown. By means of the screw 6 the angle piece 4 is attached to the drawing or scribing arm 7, and by means of the thumbscrew 8 an adjustable slide 9 may be secured at any desired point along the arm 7. Passing through the slide 9 is a pin 10, which may be adjusted up or down and clamped with the slide to hold the pencil of the scribing devices off the work when necessary. A second sliding block 11 will be noted near the end of the bar, through which passes a pencil 12 and the block and pencil may be secured to the arm 7 by a thumbscrew 12'. The pencil hole is drilled partly into the recess in the slide block 11, so that by tightening the set screw 12' both the block and the pencil are firmly attached to the arm 7.

As best shown in Fig. 2, a micrometer screw 13 is carried by the frame 14. This is the glass holding frame. The glasses 15 and 16 are borne by the glass holding frame in the individual metal sliding frames 15' and 16', and the frame 16' may be held in a fixed position by means of the set screw 17 passing through the side of frame 14. Between the glass frames 15' and 16' is arranged a double spring 18 acting to separate those frames in yielding relation. Indicator dots 19 and 20 are etched at the centers of the glasses on both sides, and the dots will be further mentioned in the statement of the operation.

Again considering Fig. 1, in connection with Figs. 5 to 9, the movable frame 2 has an arm 21 pivotally attached thereto at one end of the arm. The movable end of the arm 21 is connected by the hinge 22 with the lens frame or eye piece 23 holding the lenses 24 and 25. Constructed to engage the edge of the board or table 1 at any point is a clamp 26 to which are pivoted at separated points the link or connecting bars 27 and 28, and the other ends of the links are pivotally attached at separated points to the junction plate 29. To the junction plate 29 are likewise coupled at separated points the spaced rods 30 and 31, and the other ends of those rods are pivotally attached to a plate 32 also at separated points. The plate 32 is ordinarily provided with a knob 33 by which the positions of the members of the instrument may be manipulated. It is held to be within the purview of this invention to provide the edge of the connector plate 32 with a scale 34, and the plate may be adjustably secured by means of the set screw 35 to the block or extension piece 36 attached to the movable frame 2.

Figure 9:
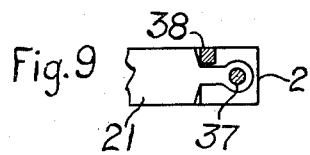
Fig. 9 is a like fragmentary view of the pivoted end of the arm positioned at the limit of its movement.

Considering Figs. 5, 6, 8 and 9, it will be noted that the pivotal or swinging arm 21 has a pivot pin connection 37 with the frame 2, and a portion 38 of the frame acts as a stop to limit the movement of the arm. In Fig. 5 the frame 2 is represented as removed from the board, and the arm 21 has been turned backward from the position shown in Fig. 7 over the rear side of the frame and then turned upward into the frame as set forth in Fig. 6, and against the stop 38 as illustrated in Fig. 9. Now, the lens frame 23 is also turned backward upon the arm in the frame. In this manner, after the inner frame and the glass plates have been removed, the parts may be collapsed for packing or shipment. Considering Fig. 7 and Fig. 8 it will be noted that the stop 38 is arranged to hold the arm 21 in its raised inclined position.

In the operation of this invention it will be understood that each of the four co-acting portions of this instrument as mentioned at the beginning of this description is adjustable with respect to the others.

The magnifying stereoscope may be used alone without the micrometer adjustment, and if so, the drafting or scribing arm and attachments for holding prints on the board will be found very helpful in field work.

When relief is to be measured, the micrometer parallax measuring attachment is fitted into position, and the centers of the dots should be in a direct line horizontally with the lenses.

The left glass with the measuring dot inscribed may be adjusted in a right or left direction. However, it should be kept at a point so that the right glass can be moved to its full extent, which with the average operator's eyes is limited to something less than one-quarter of an inch.

If it is found that the measuring dots do not line up in a north and south direction, the screws which hold the glass in position can be loosened up and the glass shifted slightly so that the alignment is perfect. The easiest means of lining up the dots in a north and south direction is by changing the angle of the instrument in relation to the drafting board, or prints, or by shifting the prints in the north and south direction.

If the operator experiences difficulty in being able to get the dots to coincide in either an east or west or a north and south direction, this may be corrected by moving one of the prints in what appears to be the opposite direction until the dots come together. When this is accomplished, it will be found that elevations which can be measured within a limit of a quarter of an inch can be accommodated.

To measure the vertical relief, or the height of trees, buildings, hills, etc., it is necessary to first obtain a constant multiple for each set of photographs made at a particular scale with a particular focal length lens. This is accomplished by first obtaining some known elevation by field measurements and, with this information, checking that particular point on the photograph for relief. For example, if it is found by ground measurements that a certain tree, building or hill is sixty feet high and that the micrometer has to be moved twelve one-thousandths of an inch to raise or lower the floating dot from the top to the bottom of this elevation, the method would be to divide 60 by 12, the answer being 5. Then the multiple for all other micrometer measurements on other points in relief on the photograph would be 5. Once a multiple is found, need for extra tables or computations is eliminated, and in so far as some ground control is necessary to start any kind of a contour map using stereoscopic plotting methods, this information can be quickly obtained from the known ground control. From there on, other parallax measurements would be constant.

Another phenomenon which presents itself in measuring parallax is the fact that, if the prints are not perfectly lined up both north and south, and east and west, the dot will appear to rise or fall as the contour finder is moved around, depending upon the alignment of the prints. To correct this at the start of a plan for contouring, two points of equal elevation should be established on a pair of prints, and then, by moving the contour finder along a straight line from north to south, the prints can be moved inwardly or outwardly until the floating dot appears to set on the ground at the two equal elevations and neither rises or falls as the instrument is moved from the north to the south on the board.

When a pair of prints have been perfectly lined up, it is possible to go from one point to another for a distance of about three inches from the center in either a north or south direction and still hold the dots in position and in equal alignment.

The drafting arm is principally for the purpose of scribing contours directly onto maps of equal scale, or another set of photographs of equal scale. However, it is possible to attach the instrument to the arm of a pantograph and, by using the mechanical adjustments of the pantograph, to draft contours onto maps of another scale.

The small drawing board with adjustable arm is principally intended to hold the instrument in alignment. However, the instrument can be attached to the conventional arm of a Universal drafting machine with equal results of holding the instrument in alignment.

The micrometer for measuring parallax or relief is graduated down to $1/10,000$ of an inch. To obtain an average high degree of accuracy, it is sometimes advisable to make three measurements of the same point in relief and by taking an average, very accurate results may be obtained.

After a multiple has been found for a set of photographs, the method is to bring the dots into coincidence by moving the pictures or the instrument around the center point until the alignment is perfect. Then, with the dot on either a high or low point, take a reading on the micrometer. Next move the dot to another high or low point and take another reading on the micrometer. By using the difference in these two readings and multiplying by the constant number, the result will have the difference in elevation in fact.

For example, if it is desired to know the height of any tree, hill, building, etc., the dot is put at the base of the object to be measured and the reading taken on the micrometer. Then the dot is moved to the top of the object to be measured. If the constant number is three and the micrometer has been moved ten thousandths of an inch, the elevation would be thirty feet. This plan of procedure can be carried out, using any scale photographs and any focal length lens, once there has been found the constant for a particular group of photographs.

Having now described this invention and the manner of its use, I claim:

1. In a contour finder, a supporting board, an outer rectangular frame movable upon the board, an inner rectangular frame in the outer frame and adjustable therein, the inner frame having adjacent rectangular glass plates with indicating marks thereon, means for securing one plate in position, means for adjusting a second plate towards or from the first plate, an arm pivotally projecting from the side of the outer frame, a lens frame and lenses pivotally attached to the projecting end of the arm whereby the plates may be observed through the lenses and whereby the lenses and arm may be folded into said outer frame, and an adjustable scriber arm and pencil holder connected with said outer frame.

2. In a contour finder, an outer frame constructed to be carried by a flat supporting surface and removable therefrom, an adjustable scriber arm attached to said outer frame and detachable from said frame, an inner frame in said outer frame having indicating glass plates, said inner frame and plates being removable from said outer frame, said outer frame having a projecting arm pivotally connected with one side of the frame whereby the arm may be turned backward over the side of the outer frame and upward into the frame, and a lens frame and lenses pivotally secured to the projecting end of said arm and adapted to be turned back upon the arm whereby said parts are located in collapsed relation.

TALBERT ABRAMS.